2,957,883

SULFAMYL DERIVATIVES OF CERTAIN SACCHARINS AND PROCESS

Frederick C. Novello, Lansdale, Pa., assignor to Merck & Co., Inc., Rahway, N.J., a corporation of New Jersey No Drawing. Filed Oct. 9, 1957, Ser. No. 689,027

7 Claims. (Cl. 260—301)

This invention is concerned with novel saccharin compounds which contain a sulfamyl substituent in the benzenoid portion of the nucleus. The structural formula of the new compounds of this invention is illustrated below. In those compounds having no substituent other than hydrogen on the nitrogen atom of the saccharin nucleus, the molecule possesses a lactam-lactim tautomeric system wherein the tautomers are interconvertible by means of an alpha, gamma proton shift; the double bond in the lactim tautomer, structure B, being between the 2,3-position atoms. When substitution other than hydrogen occurs on the nitrogen of the saccharin nucleus, the molecule can exist only in the lactam form, structure A. Thus, in general, the compounds can be considered having one of the general structures A or B:

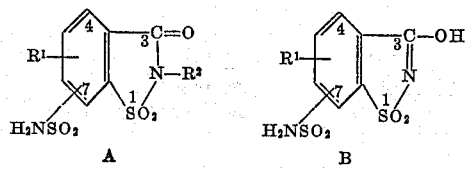

A          B

The novel sulfamylsaccharin compounds of this invention therefore comprise compounds having a structure as illustrated and defined above, and include their non-toxic alkali metal and alkaline earth metal salts, wherein $R^1$ is a halogen such as chlorine, bromine, or fluorine, a lower alkyl radical advantageously having from 1 to 5 carbon atoms, a lower alkoxy radical also preferably having from 1 to 5 carbon atoms, a nitro or an amino radical; $R^2$ is hydrogen, a lower alkyl radical advantageously having from 1 to 5 carbon atoms, a lower alkenyl radical also advantageously having from 1 to 5 carbon atoms, an aralkyl radical advantageously a mononuclear aryl-lower alkyl radical, an alkanoyl radical preferably having from 1 to 5 carbon atoms in the chain, an aroyl radical advantageously derived from a mononuclear aryl-mono-carboxylic or dicarboxylic acid, an omega substituted alkyl radical having the structure —$(CH_2)_n$—X wherein $n$ is an integer selected from 2 through 6 and X represents bromine, hydroxyl, an unsubstituted or a substituted amino group such as a mono-lower alkylamino or a di-lower alkylamino, a piperidyl, pyrrolidyl, or morpholinyl radical, or $R^2$ can have the structure —$(CH_2)_m$—COOR wherein R is hydrogen or an esterifying group, such as a lower alkyl radical and $m$ is a whole number from 1 through 4, or $R^2$ can have the structure —OC—$(CH_2)_a$—COOR wherein R has the meaning assigned to it above and $a$ is a whole number from 2 to 4.

The novel sulfamylsaccharin compounds of this invention are useful pharmacotherapeutic agents particularly because of their diuretic, natriuretic and/or saluretic properties (hereinafter referred to as diuretic properties). They can be administered in therapeutic dosages in conventional vehicles as in the form of tablets, pills, capsules, and the like as these compounds are effective upon oral administration. As the compounds of this invention also are soluble in an alkaline medium or in polyethyleneglycol, injectable solutions can be prepared for parenteral administration by dissolving the compound in the selected medium to which preservatives can be added if desired. While dosages between about 5 to about 10 mg./kg./day generally are suitable to produce a diuretic response, more or less of the selected active ingredient can be employed depending upon the age and condition of the individual who is to receive the compound and for this reason scored tablets comprising 0.5 g. of active ingredient or more can be supplied to the physician for the symptomatic adjustment of dosage to the individual patient. These recommended dosages appear to be well below the toxic dose of the sulfamylsaccharin compounds of this invention as evidenced by the fact the acute intravenous $LD_{50}$ in mice of one of the compounds falling within the scope of this invention, that is of the compound 5-chloro-6-sulfamyl-saccharin, was found to be greater than 1,000 mg./kg. and no toxic reactions were observed when this compound was administered to dogs, intravenously, at dosages up to 15 mg./kg.

The diuretic properties of the novel compounds of this invention make them particularly useful in the treatment of congestive heart failure and other abnormalities which produce an edematous condition in the body, or which produce an imbalance in the electrolyte concentration in the body as, for example, those in which an abnormal retention of sodium occurs.

The novel sulfamlysaccharin compounds of this invention can be prepared by the methods illustrated below

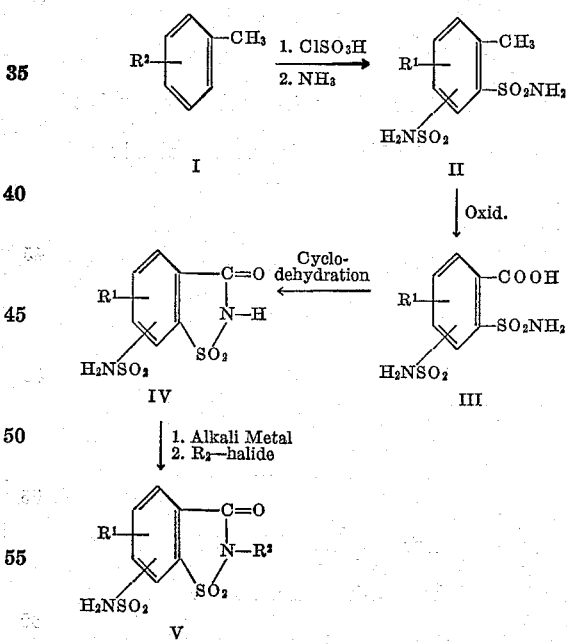

In general, the preparation of the saccharin compounds of this invention involves the chlorosulfonation of the selected toluene compound, I, with chlorosulfonic acid to prepare the disulfonyl chloride derivative which then is converted to the disulfamyl derivative by treatment with ammonia. The disulfamyltoluene compound, II, then is oxidized to convert the methyl group to a carboxyl group and the resulting disulfamylbenzoic acid compound, III, is cyclo-dehydrated to the corresponding sulfamylsaccharin compound, IV. The sulfamylsaccharin derivatives, V, wherein $R^2$ is a substituent other than hydrogen can be prepared from compound IV, by first making the mono-alkali metal salt of compound IV which then is reacted with a halide of the particular compound ($R^2$-halide)

which will yield the substituent, $R^2$, desired attached to the nitrogen atom of the saccharin nucleus.

The conversion of the selected toluene compound, I, to the disulfamyltoluene compound, II, is accomplished by first chlorosulfonating compound I with chlorosulfonic acid advantageously employing an excess of a molar equivalent of chlorosulfonic acid and preferably heating the reaction mixture at between about 60–175° C. The disulfonyl chloride derivative thus obtained then is treated with ammonia, preferably between about 0° C. to room temperature and then heating the reaction mixture, advantageously on the steam bath, thus forming the disulfamyltoluene compound, II.

The ammonia used in the amidation step is employed in excess of that required to convert each of the sulfonyl chloride substituents to the sulfamyl group. Preferably, at least four molecular equivalents of ammonia is employed in this reaction in order to replace each of the chlorine atoms in the sulfonyl chloride groups and to take up the liberated hydrogen chloride. Ammonia in substantially any form can be employed in this reaction such as liquid ammonia, concentrated ammonium hydroxide, alcoholic ammonia, or ammonia gas.

The disulfamyl toluene, II, then is oxidized to the corresponding disulfanmylbenzoic acid, III. Oxidation can be effected by a number of oxidizing agents such as potassium permanganate, and chromic anhydride-sulfuric acid mixtures and the like. The reaction, when potassium permanganate is employed, is continued until the characteristic permanganate color disappears.

The disulfamylbenzoic acid, III, is cyclo-dehydrated to the corresponding sulfamylsaccharin compound, IV, advantageously by heating to the melting point of the disulfamylbenzoic acid or by mixing the disulfamylbenzoic acid with sulfuric acid at room temperature or by heating a mixture of the disulfamylbenzoic acid and phosphoryl chloride (phosphorus oxychloride), preferably on a steam bath.

The derivatives of the sulfamylsaccharin compounds of this invention wherein $R^2$ is a substituent other than hydrogen are prepared by first forming a mono-alkali metal salt, such as the potassium or sodium salt of the saccharin compound, IV. The salt can be prepared by dissolving one equivalent of the selected alkali metal in alcohol and adding the sulfamylsaccharin compound, IV. The reaction mixture is agitated until the saccharin compound dissolves, the solvent then is removed in vacuo, and the residue, which represents the mono-alkali metal salt of the saccharin compound, IV, is dissolved in a solvent, such as dimethylformamide, and the compound $R^2$-halide is added to the reaction mixture. The reaction between these ingredients is exothermic and generally will go to completion if it is stirred until the temperature of the mixture is lowered to about 25° C. In some instances it may be advisable to heat the reaction mixture on the steam bath for about 30–60 minutes to facilitate completion of the reaction. The 2-substituted saccharin compound, V, thus prepared, can be separated by diluting the reaction mixture with water and recovering the precipitate.

The alkali metal salts of the sulfamylsaccharin compounds of this invention can be prepared as described above or by any of the conventional methods such as by dissolving the selected saccharin compound in an aqueous or alcoholic solution of the alkali metal hydroxide. The mono- or di-salts can be prepared by employing one equivalent or an excess of the alkali metal hydroxide. Any of the conventional alkali metal salts, such as the sodium, potassium, lithium, or the like salts can be prepared by this method or by other methods known to organic chemists. The alkaline earth metal salts are prepared from the alkali metal salts of the saccharin compounds by replacement of the alkali metal by an alkaline earth metal by well known procedures.

While the above discussion outlines general methods suitable for the preparation of the sulfamylsaccharin compounds of this invention, other methods can, of course, be employed. Also, modifications can be made in the procedural steps described above to improve the conditions for the preparation of any particular compound it is desired to prepare. It is to be understood, therefore, that the above discussion of suitable methods and the following examples, which more fully described the preparation of the compounds of this invention, are illustrative of the methods which can be employed for the preparation of the novel compound, and are not to be construed as limiting the invention to the particular methods or the particular compound specifically described.

EXAMPLE 1

*5-chloro-6-sulfamylsaccharin*

*Step A.*—m-Chlorotoluene (31.8 g.) is added dropwise over a period of 15–20 minutes to 165 ml. of chlorosulfonic acid cooled in an ice bath. After heating the reaction mixture at 150–160° C. for 3 hours, the solution is cooled in an ice bath and then poured onto ice The solid is collected on the filter, washed with water, and added portionwise to 150 ml. of 28% ammonium hydroxide cooled in an ice bath. The reaction mixture then is heated on the steam bath for 2 hours after which the mixture is cooled and the product which precipitates is collected on the filter and recrystallized from aqueous alcohol yielding 5-chloro-2,4-disulfamyltoluene, M.P. 256–257° C.

Analysis calculated for $C_7H_9ClN_2O_4S_2$: C, 29.52; H, 3.19. Found: C, 29.65; H, 3.10.

*Step B.*—A solution of 4.9 g. of the thus obtained product in 125 ml. of 5% aqueous sodium hydroxide is heated on the steam bath with 8.8 g. of potassium permanganate with stirring for 30 minutes. The mixture is filtered, acidified, with dilute hydrochloric acid, and concentrated to dryness in vacuo. Recrystallization of the residue from water yields 5-chloro-2,4-disulfamylbenzoic acid, M.P. 200° C. (dec.).

Analysis calculated for $C_7H_7ClN_2O_6S_2$: C, 26.71; H, 2.24; N, 8.90. Found: C, 26.79; H, 2.66; N, 8.71.

*Step C.*—A solution of 8 g. of the thus obtained product in 25 ml. of concentrated sulfuric acid is allowed to stand at room temperature for 1 hour. Cold water (100 ml.) is added and the precipitate collected on the filter and recrystallized from 50% alcohol-water to give 5-chloro-6-sulfamylsaccharin, M.P. 273–275° C. (dec.).

Analysis calculated for $C_7H_5ClN_2O_5S_2$: C, 28.33; H, 1.70; N, 9.44. Found: C, 28.53; H, 1.85; N, 9.41.

EXAMPLE 2

*5-fluoro-6-sulfamylsaccharin*

By replacing the m-chlorotoluene employed in Example 1 by an equimolecular quantity of m-fluorotoluene, and following substantially the same procedures described in Example 1, Steps A through C, there is obtained 5-fluoro-6-sulfamylsaccharin.

EXAMPLE 3

*5-bromo-6-sulfamylsaccharin*

By replacing the m-chlorotoluene employed in Example 1 by an equimolecular quantity of m-bromotoluene, and following substantially the same procedures described in Example 1, Steps A through C, there is obtained 5-bromo-6-sulfamylsaccharin.

EXAMPLE 4

*5-methyl-6-sulfamylsaccharin*

By replacing the m-chlorotoluene employed in Example 1 by an equimolecular quantity of m-xylene, and following substantially the same procedures described in Example 1, Steps A through C, there is obtained 5-methyl-6-sulfamylsaccharin.

EXAMPLE 5

*5-butyl-6-sulfamylsaccharin*

By replacing the m-chlorotoluene employed in Example 1 by an equimolecular quantity of m-butyltoluene, and following substantially the same procedures described in Example 1, Steps A through C, there is obtained 5-butyl-6-sulfamylsaccharin.

EXAMPLE 6

*5-ethoxy-6-sulfamylsaccharin*

By replacing the m-chlorotoluene employed in Example 1 by an equimolecular quantity of m-ethoxytoluene, and following substantially the same procedures described in Example 1, Steps A through C, there is obtained 5-ethoxy-6-sulfamylsaccharin.

EXAMPLE 7

*5-butoxy-6-sulfamylsaccharin*

By replacing the m-chlorotoluene employed in Example 1 by an equimolecular quantity of m-butoxytoluene, and following substantially the same procedures described in Example 1, Steps A through C, there is obtained 5-butoxy-6-sulfamylsaccharin.

EXAMPLE 8

*5-nitro-6-sulfamylsaccharin*

By replacing the m-chlorotoluene employed in Example 1 by an equimolecular quantity of m-nitrotoluene, and following substantially the same procedures described in Example 1, Steps A through C, there is obtained 5-nitro-6-sulfamylsaccharin.

EXAMPLE 9

*5-amino-6-sulfamylsaccharin*

A solution of 5.0 g. of the 5-nitro-6-sulfamylsaccharin, obtained as described in Example 8, in 500 ml. of a 50% alcohol-water mixture is shaken in an atmosphere of hydrogen with 400 mg. of platinum oxide catalyst until hydrogen absorption ceases. The catalyst is removed by filtration and the solution concentrated to dryness in vacuo. Crystallization of the residue from a 50% alcohol-water mixture yields 5-amino-6-sulfamylsaccharin.

EXAMPLE 10

*6-chloro-5-sulfamylsaccharin*

Step A.—4-chlorotoluene-2,5-disulfonyl chloride (0.5 mole) is added portionwise to 150 ml. of 28% ammonium hydroxide cooled in an ice bath. The reaction mixture is heated on the steam bath for two hours after which the mixture is cooled and the product which precipitates is collected on the filter and recrystallized from aqueous alcohol yielding 4-chloro-2,5-disulfamyltoluene.

Step B.—By replacing the 5-chloro-2,4-disulfamyltoluene employed in Example 1, Step B, by an equimolecular quantity of 4-chloro-2,5-disulfamyltoluene prepared as described above, and following substantially the same procedures described in Example 1, Steps B and C, there is obtained 6-chloro-5-sulfamylsaccharin.

EXAMPLE 11

*2-(2-bromoethyl)-5-chloro-6-sulfamylsaccharin*

5-chloro-6-sulfamylsaccharin (3 g.), prepared as described in Example 1, is dissolved in an alcoholic solution of potassium ethoxide prepared from 0.4 g. of potassium and 50 ml. of anhydrous ethanol. The solution is concentrated to dryness in vacuo and the residue stirred with 20 ml. of dimethylformamide and 1.9 g. of ethylene bromide for 30 minutes. The mixture is heated on the steam bath for 30 minutes, cooled and diluted with 100 ml. of water. The product which precipitates is collected and recrystallized from ethanol yielding 2-(2-bromoethyl)-5-chloro-6-sulfamylsaccharin.

EXAMPLE 12

*2-(3-bromopropyl)-5-chloro-6-sulfamylsaccharin*

By replacing the ethylene bromide employed in Example 11 by an equimolecular quantity of 1,3-dibromopropane and following substantially the same procedures described in Example 11, there is obtained 2-(3-bromopropyl)-6-sulfamylsaccharin.

EXAMPLE 13

*2-carbethoxymethyl-5-chloro-6-sulfamylsaccharin*

By replacing the ethylene bromide employed in Example 11 by an equimolecular quantity of ethyl bromoacetate, and following substantially the same procedure described in Example 11, there is obtained 2-carbethoxymethyl-5-chloro-6-sulfamylsaccharin.

EXAMPLE 14

*2-carboxymethyl-5-chloro-6-sulfamylsaccharin*

A solution of 2-carbethoxymethyl-5-chloro-6-sulfamylsaccharin (10 g.), prepared as described in Example 13, in 100 ml. of 10% aqueous sodium hydroxide is heated under reflux for 1 hour, cooled, and acidified with dilute hydrochloric acid. The precipitate is collected and recrystallized from aqueous alcohol yielding 2-carboxymethyl-5-chloro-6-sulfamylsaccharin.

EXAMPLE 15

*2 - (3 - carbomethoxypropionyl) - 5 - chloro - 6 - sulfamylsaccharin*

By replacing the ethylene bromide employed in Example 11 by an equimolecular quantity of the acid chloride of methyl hydrogensuccinate, and following substantially the same procedure described in Example 11, there is obtained 2 - (3 - carbomethoxypropionyl) - 5 - chloro - 6 - sulfamylsaccharin.

EXAMPLE 16

*2 - (2 - hydroxyethyl) - 5 - chloro - 6 - sulfamylsaccharin*

To a solution of 4 g. of 2 - (2 - bromoethyl) - 5 - chloro - 6 - sulfamylsaccharin, prepared as described in Example 11, in a mixture of 40 ml. of ethanol and 5 ml. of 10% aqueous sodium hydroxide, heated on the steam bath, 15 ml. of 10% aqueous sodium hydroxide is added dropwise over 30 minutes. After heating for an additional 30 minutes, the solution is cooled and neutralized with dilute hydrochloric acid. The precipitate which forms is collected and recrystallized from aqueous ethanol yielding 2 - (2 - hydroxyethyl) - 5 - chloro - 6 - sulfamylsaccharin.

EXAMPLE 17

*2 - (2 - aminoethyl) - 5 - chloro - 6 - sulfamylsaccharin*

A solution of 5 g. of 2 - (2 - bromoethyl) - 5 - chloro - 6 - sulfamylsaccharin, prepared as described in Example 11, in 100 ml. of 10% alcoholic ammonia is heated under reflux for 3 hours. The solution is concentrated to dryness in vacuo and the residue recrystallized from aqueous alcohol yielding 2 - (2 - aminoethyl) - 5 - chloro - 6-sulfamylsaccharin.

EXAMPLE 18

*2 - (2 - n - propylaminoethyl) - 5 - chloro - 6 - sulfamylsaccharin*

A solution of 5 g. of 2 - (2 - bromoethyl) - 5 - chloro - 6 - sulfamylsaccharin, prepared as described in Example 11, in 100 ml. of a 10% alcoholic solution of propylamine is heated under reflux for 3 hours. The reaction mixture is concentrated to dryness in vacuo and the residue recrystallized from aqueous alcohol yielding 2 - (2 - n - propylaminoethyl) - 5 - chloro - 6 - sulfamylsaccharin.

EXAMPLE 19

*2 - (2 - piperidinoethyl) - 5 - chloro - 6 - sulfamylsaccharin*

By replacing the propylamine employed in Example 18 by an equal quantity of piperidine, and following substantially the same procedure described in Example 18, there is obtained 2 - (2 - piperidinoethyl) - 5 - chloro - 6-sulfamylsaccharin.

EXAMPLE 20

*5 - chloro - 2 - n - propyl - 6 - sulfamylsaccharin*

By replacing the ethylene bromide employed in Example 11 by an equimolecular quantity of propylbromide, and following substantially the same procedure described in Example 11, there is obtained 5 - chloro - 2 - n - propyl - 6 - sulfamylsaccharin.

EXAMPLE 21

*2 - allyl - 5 - chloro - 6 - sulfamylsaccharin*

By replacing the ethylene bromide employed in Example 11 by an equimolecular quantity of allyl bromide, and following substantially the same procedure described in Example 11, there is obtained 2 - allyl - 5 - chloro - 6-sulfamylsaccharin.

EXAMPLE 22

*2 - benzyl - 5 - chloro - 6 - sulfamylsaccharin*

By replacing the ethylene bromide employed in Example 11 by an equimolecular quantity of benzyl bromide, and following substantially the same procedure described in Example 11, there is obtained 2 - benzyl - 5-chloro - 6 - sulfamylsaccharin.

EXAMPLE 23

*5 - chloro - 2 - phenylethyl - 6 - sulfamylsaccharin*

By replacing the ethylene bromide employed in Example 11 by an equimolecular quantity of phenylethyl bromide, and following substantially the same procedure described in Example 11, there is obtained 5 - chloro - 2- phenylethyl - 6 - sulfamylsaccharin.

EXAMPLE 24

*2 - butyryl - 5 - chloro - 6 - sulfamylsaccharin*

By replacing the ethylene bromide employed in Example 11 by an equimolecular quantity of butyryl bromide and following substantially the same procedure described in Example 11, there is obtained 2 - butyryl - 5-chloro - 6 - sulfamylsaccharin.

EXAMPLE 25

*5 - chloro - 2 - phenylacetyl - 6 - sulfamylsaccharin*

By replacing the ethylene bromide employed in Example 11 by an equimolecular quantity of phenylacetyl bromide, and following substantially the same procedure described in Example 11, there is obtained 5 - chloro - 2-phenylacetyl - 6 - sulfamylsaccharin.

EXAMPLE 26

*Di - sodium salt of 5 - chloro - 6 - sulfamylsaccharin*

5 - chloro - 6 - sulfamylsaccharin (0.1 mole), prepared as described in Example 1, is dissolved in alcoholic sodium hydroxide containing two equivalents of sodium, and the solvent then is evaporated in vacuo yielding the di-sodium salt of 5 - chloro - 6 - sulfamylsaccharin.

EXAMPLE 27

*Compressed tablets comprising 0.5 g. active ingredient*

|  | G. |
|---|---|
| 5 - chloro - 6 - sulfamylsaccharin | 500.0 |
| Starch paste 12½%, 100 cc. allow | 12.5 |
|  | 512.5 |
| Starch U.S.P. corn | 25.0 |
| Magnesium stearate | 5.5 |
|  | 543.0 |

The 5 - chloro - 6 - sulfamylsaccharin is granulated with the starch paste and while moist passed through a No. 14 screen, dried at 45° C. for 20 hours and then passed three times through a No. 14 screen. The starch then is passed through a No. 90 bolting cloth onto the granulation and all ingredients are blended thoroughly. Then the magnesium stearate is passed through a No. 90 bolting cloth onto the granulation and these ingredients are blended after which the granulation is compressed into tablets using 14/32″ flat, bevelled, scored punch having a thickness of 0.205±0.005″, yielding 1,000 tablets each weighing 0.543 gram and having a hardness of 6 kgms. measured by the Monsanto Chemical Company tablet hardness tester apparatus, and a disintegration time of five minutes when tested on the U.S.P. tablet disintegrating apparatus (U.S. Pharmacopeia, 15th edition, page 937).

Tablets prepared as described above are suitable for oral administration at a dosage regimen individualized for each patient by his physician.

While the above examples describe the preparation of certain illustrative compounds illustrated by the structure in column 1, and a specific dosage form suitable for administering the novel compounds of this invention in human therapy and certain methods suitable for making the sulfamylsaccharin compounds of this invention, it is to be understood that the invention is not to be limited by these examples or by the specific reaction conditions described for the preparation of the compounds or by the specific ingredients included in the pharmaceutical preparation, but is understood to embrace variations and modifications falling within the scope of the appended claims.

What is claimed is:

1. A saccharin compound selected from the group consisting of a compound having one of the general structures

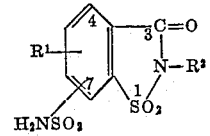

and

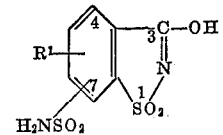

and alkali metal salts and alkaline earth metal salts thereof; wherein $R^1$ is selected from the group consisting of a halogen, a lower alkyl radical, a lower alkoxy radical, a nitro and the amino radical; $R^2$ is selected from the group consisting of hydrogen, a lower alkyl radical, a lower alkenyl radical, a phenyl-lower alkyl radical, a lower alkanoyl radical, a phenyl-lower alkanoyl radical, an omega-halo-lower alkyl radical, an omega-hydroxy-lower alkyl radical, an omega-(mono-lower alkylamino)-lower alkyl radical, an omega-(di-lower alkylamino)-lower alkyl radical, an omega-piperidyl-lower alkyl radical, an omega-pyrrolidyl-lower alkyl radical, an omega-morpholinyl-lower alkyl radical, an omega-carboxy-lower alkyl radical, an omega-carbalkoxy-lower alkyl radical, an omega-carboxy-lower alkanoyl radical, and an omega-carbalkoxy-lower alkanoyl radical.

2. A saccharin compound having one of the general structures

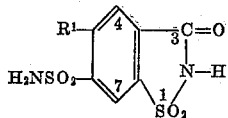

and

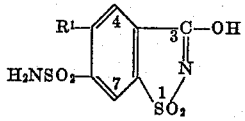

wherein $R^1$ is a halogen.

3. 5-chloro-6-sulfamylsaccharin.

4. A saccharin compound having one of the general structures

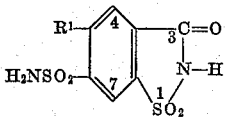

and

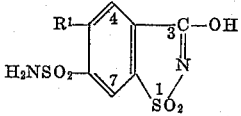

wherein $R^1$ is a lower alkyl radical.

5. 5-nitro-6-sulfamylsaccharin.

6. A process for the preparation of a sulfamylsaccharin compound wherein a disulfamylbenzoic acid having the general structure

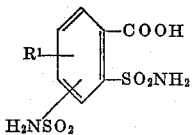

is cyclo-dehydrated by stirring the disulfamylbenzoic acid in the presence of sulfuric acid at room temperature thus forming a sulfamylsaccharin compound having one of the general structures

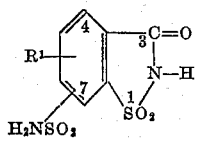

and

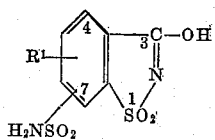

wherein in each of the above structures $R^1$ is selected from the group consisting of a halogen, a lower alkyl radical, a lower alkoxy radical, and a nitro group.

7. A process as claimed in claim 8 wherein an alkali metal salt of a sulfamylsaccharin compound having one of the general structures

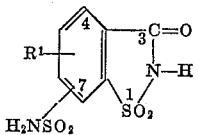

and

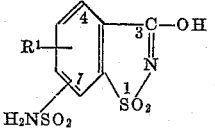

is prepared by stirring a mixture of the sulfamylsaccharin compound and one equivalent of the alkali metal in alcohol, removing the solvent, and reacting the mono-alkali metal salt of the sulfamylsaccharin compound thus obtained with a compound having the general structure $R^2$-halogen in the presence of a solvent thus forming a sulfamylsaccharin compound having the general structure

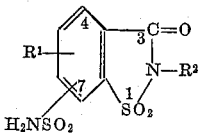

wherein in each of the above structures $R^1$ is selected from the group consisting of halogen, a lower alkyl radical, a lower alkoxy radical, and a nitro group; and $R^2$ is selected from the group consisting of hydrogen, a lower alkyl, a lower alkenyl, a phenyl-lower alkyl, a lower alkanoyl, a phenyl-lower alkanoyl, an omega-halo-lower alkyl, an omega-hydroxy-lower alkyl, an omega-(mono-lower alkylamino)-lower alkyl radical, an omega-(di-lower alkyl-amino)-lower alkyl radical; an omega-piperidyl-lower alkyl radical, an omega-pyrrolidyl-lower alkyl radical, an omega-morpholinyl-lower alkyl, an omega-carboxy-lower alkyl, an omega-carbalkoxy-lower alkyl, an omega-carboxy-lower alkanoyl, and an omega-carbalkoxy-lower alkanoyl radical.

No references cited.